Figure 1:
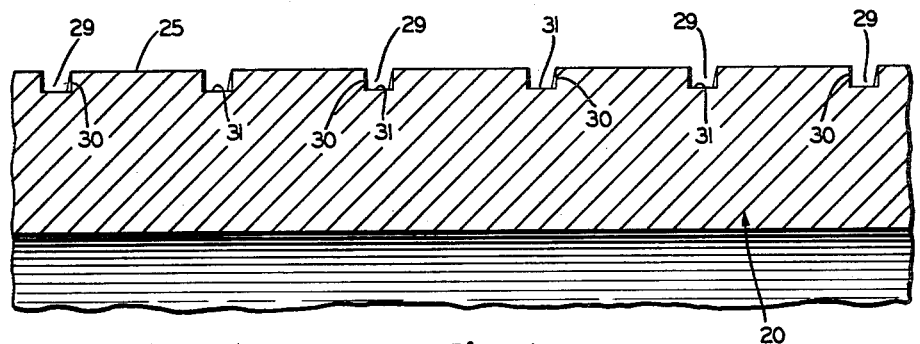

Dec. 3, 1963 A. C. K. NIHLEN ETAL 3,112,558
FINNED TUBING MANUFACTURE
Original Filed March 3, 1959 3 Sheets-Sheet 1

INVENTORS
Arvid C. K. Nihlen
BY Karl A. Gardner

Frease, Bishop, Johns & Schick
ATTORNEYS

Dec. 3, 1963  A. C. K. NIHLEN ETAL  3,112,558
FINNED TUBING MANUFACTURE
Original Filed March 3, 1959  3 Sheets-Sheet 2
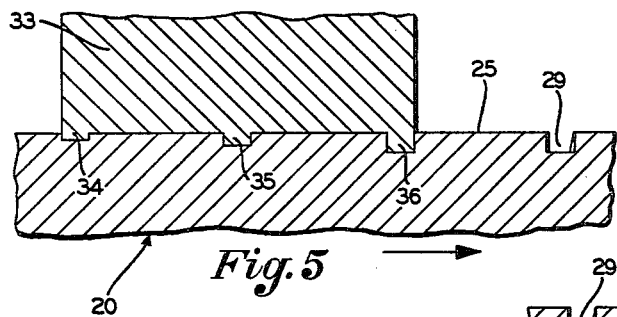
Fig. 5
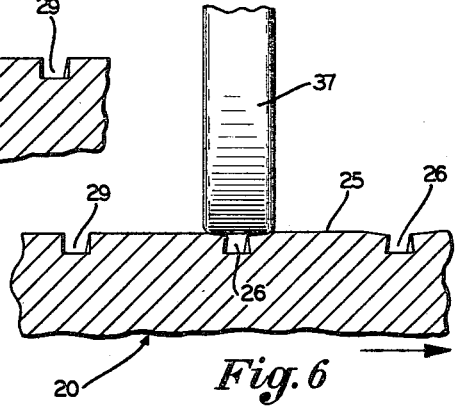
Fig. 6
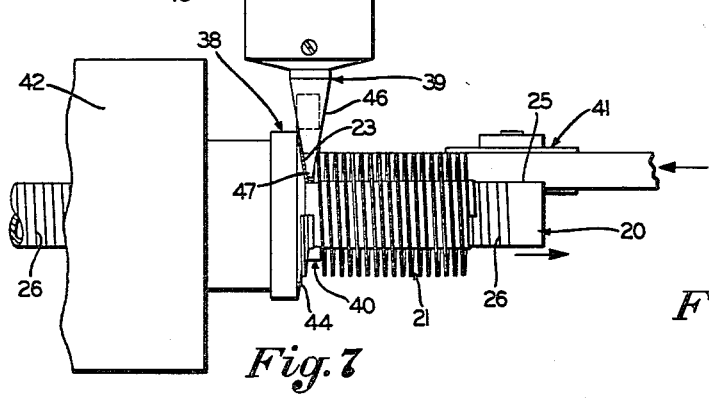
Fig. 7
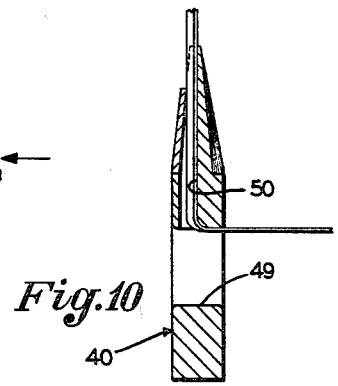
Fig. 10
Fig. 9
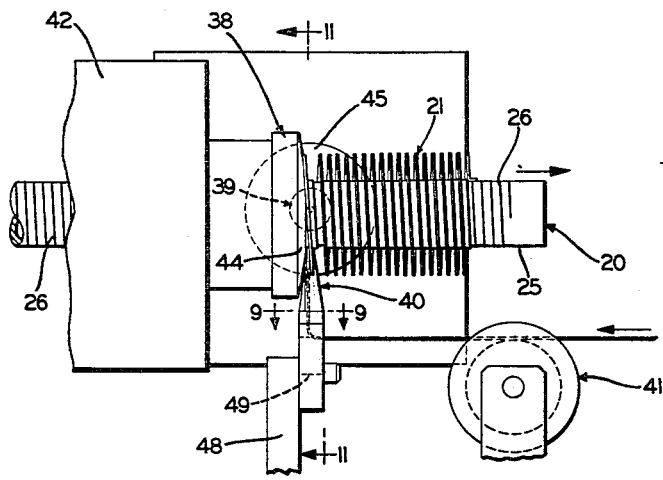
Fig. 8
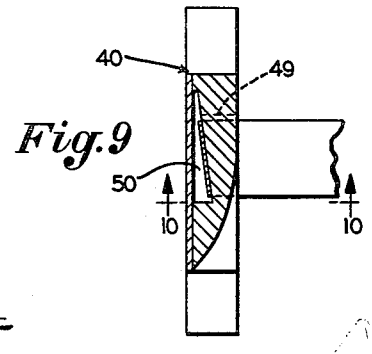
INVENTORS
Arvid C. K. Nihlen
Karl A. Gardner
BY
Frease, Bishop, Johns & Schick
ATTORNEYS Dec. 3, 1963  A. C. K. NIHLEN ETAL  3,112,558
FINNED TUBING MANUFACTURE
Original Filed March 3, 1959  3 Sheets-Sheet 3

INVENTORS
Arvid C. K. Nihlen a
Karl A. Gardner n a
BY Frease, Bishop, Johns & Schick
ATTORNEYS United States Patent Office 3,112,558
Patented Dec. 3, 1963

3,112,558
FINNED TUBING MANUFACTURE
Arvid C. K. Nihlen, Massillon, Ohio, and Karl A. Gardner, Palo Alto, Calif., assignors, by mesne assignments, to Baldwin-Lima-Hamilton Corporation, Philadelphia, Pa., a corporation of Pennsylvania
Original application Mar. 3, 1959, Ser. No. 796,794, now Patent No. 3,077,928, dated Feb. 19, 1963. Divided and this application Jan. 7, 1960, Ser. No. 1,032
7 Claims. (Cl. 29—157.3)

Our invention relates to finned tubing manufacture and more specifically to methods for applying embedded footed fins to tubing for use in heat exchanger assemblies. Even more specifically, our invention relates to methods for applying a footed fin construction which covers the entire outer exposed surface of the tubing to form a physical metal-to-metal interlock between the footed fin construction and tubing. Further, this application is a division of our co-pending application Serial No. 796,794, filed March 3, 1959, now Patent No. 3,077,928, granted February 19, 1963.

In certain uses of finned tubing in heat exchanger assemblies, it is necessary to form the tubing of steel in order to provide high strength for high pressure and high temperature work, while at the same time, if the outer surface of this steel tubing is exposed, it may be subject to corrosion and deterioration. For this reason, conventional steel finned tubing is not satisfactory under these circumstances in view of the outer surface of the steel tubing being exposed, and it is desirable to provide a sheath or cladding for the steel tubing of a relatively corrosion-resistant material, such as aluminum, and to form the fins from this aluminum to thereby gain the high strength of the steel tubing and the corrosion-resistant characteristics of the aluminum sheath or cladding forming the fins.

Certain prior constructions of finned tubing have been provided which satisfy this need, but unfortunately these constructions are limited only to certain very specific applications. In one such prior construction, the tubing is formed of steel and is telescoped by aluminum tubing, upon which aluminum tubing the fins are later formed.

In this prior construction, the only bond between the steel tubing and its covering aluminum tubing is produced either by extruding one of the two tubing layers over or within the other, preferably the aluminum tubing over the steel tubing, or by some means producing a so-called "interference fit" of the aluminum tubing onto the steel tubing so that the two lengths of tubing of different materials will tightly abut one another in proper heat transfer contact. It is then possible to form radially outwardly extending fins on the outer aluminum tubing while still maintaining the aluminum tubing as a sheath completely covering the steel tubing.

Another form of prior construction is provided by positioning a series of axially adjacent generally L-shaped cross-section collars or by spirally or helically winding generally L-shaped cross-section fin material formed of a relatively corrosion-resistant material on the outer surface of the steel tubing.

Thus, in all of these prior constructions, some form of footed fins is provided of aluminum or other relatively corrosion-resistant materials in which the foot or axially extending portions of the fins form a sheath which completely covers the inner tubing. Further, if this construction is properly formed, the inner tubing is protected fluid-tight by this sheath.

The principal difficulty with all of these prior constructions is, however, that although under certain low temperature conditions proper heat transfer contact between the steel tubing and the covering aluminum may be provided, in the case of high temperature use, the variation between the coefficients of thermal expansion of steel and aluminum causes the aluminum to expand away from the steel, thereby destroying the heat transfer contact therebetween. Furthermore, this difficulty is encountered despite the close contact of these members initially at the lower temperatures.

It is, therefore, desirable to provide a construction of footed finned tubing in which some form of permanent bond between the steel tubing and its covering aluminum or other material is used which will not permit separation between the steel and aluminum despite the differences of coefficients of thermal expansion between these two metals, and despite the subjection of such a construction to extreme temperature gradients. Furthermore, in many cases, footed fins having such a permanent bond with an underlying tube, may be used to advantage even though these footed fins may not form a complete fluid-tight sheath or covering for the underlying tube. Finally, it is desirable to provide a method of forming such a construction which is adaptable for use in modern mass-production manufacturing.

For this reason, it is a general object of the present invention to provide a method of forming footed finned tubing which solves the foregoing difficulties of the prior constructions and provides the foregoing desirable features.

It is a primary object of the present invention to provide a method of forming footed finned tubing in which a metal-to-metal interlock and heat transfer bond is formed between the footed fins and the outer surface of the tubing upon which these fins are mounted and which they cover, thereby preventing separation between the footed fins and the tubing despite subjection to extreme temperature gradients.

It is a further object of the present invention to provide a method of forming footed finned tubing in which the foot or axially extending portions of the fins which cover the outer surface of the tubing are partially embedded in this tubing outer surface.

It is still a further object of the present invention to provide a method of forming footed finned tubing in which the footed fins may be applied to the tubing in any known manner and a part of the foot portions thereof are then embedded in the outer surface of the inner tubing to form a metal-to-metal interlock between the fins and inner tubing.

It is still another object of the present invention to provide a method of forming footed finned tubing in which the footed fins may be helically or spirally wound on the outer surface of the inner tubing and may then be embedded in the tubing outer surface by rolling, thereby providing a continuous mass-production method.

Finally, it is an object of the present invention to provide a method of forming footed finned tubing which satisfies all of the above objects in an efficient manner and at a minimum of expense.

These and other objects are accomplished by the parts, constructions, combinations, subcombinations, methods and procedures comprising the present invention, the nature of which is set forth in the following general statement, preferred embodiments of which—illustrative of the best mode of which applicants have contemplated applying the principles—are set forth in the following description and illustrated in the accompanying drawings, and which are particularly and distinctly pointed out and set forth in the appended claims forming a part hereof.

In general terms, the construction of footed finned tubing produced in the present invention may be stated as including an inner tubing, preferably formed of steel, and having groove means, preferably of dove-tail cross section, formed on the outer surface thereof, with footed fins having foot portions telescoped over the inner tubing and a part of the foot portions embedded in the tubing grooves. The footed fins are preferably formed of a softer material than the steel and preferably of a material which is relatively corrosion resistant, such as for instance aluminum.

Still further, the footed fins may be helically wound on the tubing outer surface in proper relationship to helically formed dove-tail grooves in the inner tubing outer surface, with a part of the fin foot portions being embedded in the inner tubing grooves to form a metal-to-metal interlock and heat transfer bond between the inner tubing and the footed fins. Finally, with spirally wound footed fins positioned on the inner tubing outer surface and embedded in said tubing outer surface, a compressive abutment seal may be provided between the adjacent axially extending fin foot portions to thereby provide a fluid-tight seal of the footed fins over the inner tubing.

The method of the present invention in its broader terms may comprise the first forming of grooves in the tubing outer surface, then applying footed fins to this tubing outer surface which may form a continuous sheath over the tubing, and then preferably by means of rolling or otherwise forming the footed fin metal, embedding portions of the footed fins in the inner tubing grooves to provide a metal-to-metal interlock and heat transfer bond between the footed fins and inner tubing.

The preferred method of forming the embedded footed fin construction forming a part of the present invention comprises the steps of forming a continuous, helical, dove-tail cross-section groove in the outer surface of preferably steel tubing, continuously helically applying and winding generally L-shaped cross-section footed fins preferably of a metal softer than steel on the inner tubing outer surface, with the fin foot portions preferably registering in a predetermined relationship with the inner tubing grooves, and with axially extending fin foot portions abutting adjacent foot portions where a fluid-tight sheath for the inner tubing is desired. This preferred method further comprises the step of then forming the fin foot portions, preferably by rolling or other metal forming means, into the inner tubing grooves and preferably simultaneously by this same rolling, forming a tight compressive abutment between the axially extending fin foot portions and radially extending adjacent fin portions. By this method a complete seal of the footed fins over the inner tubing may be provided, as well as a metal-to-metal interlock and heat transfer bond between the footed fins and inner tubing, is provided.

Figure 2:
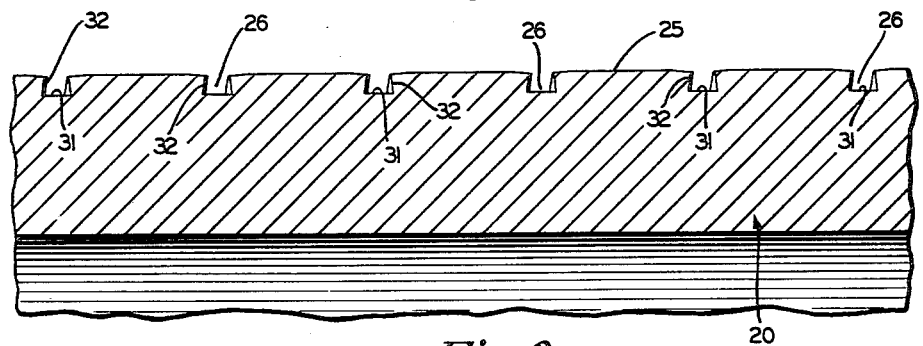
Figure 3:
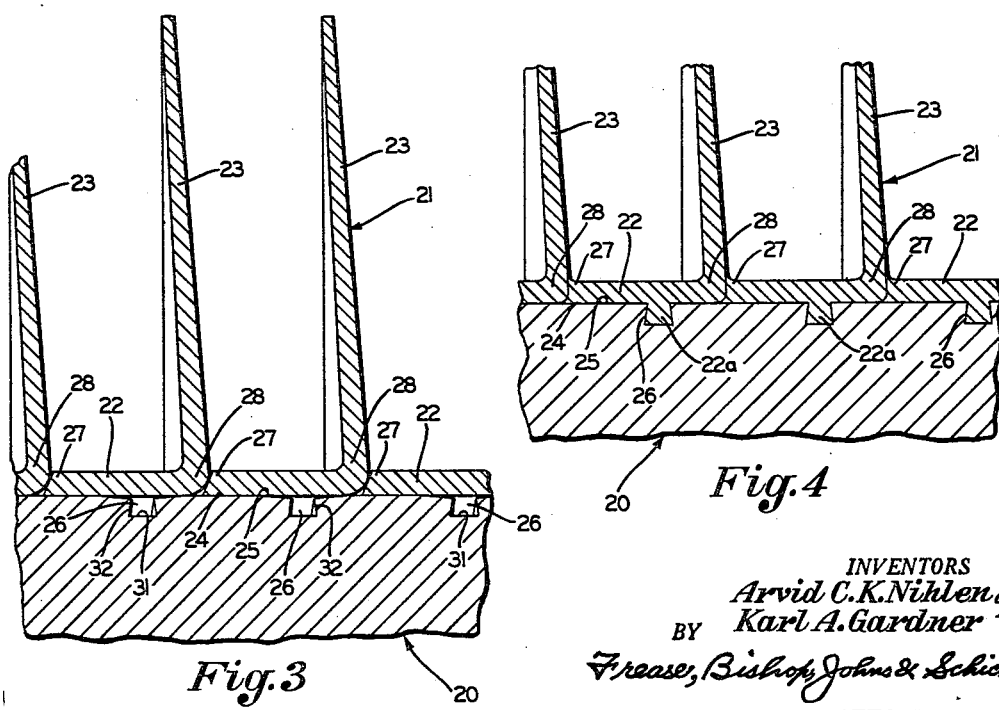
Figure 4:
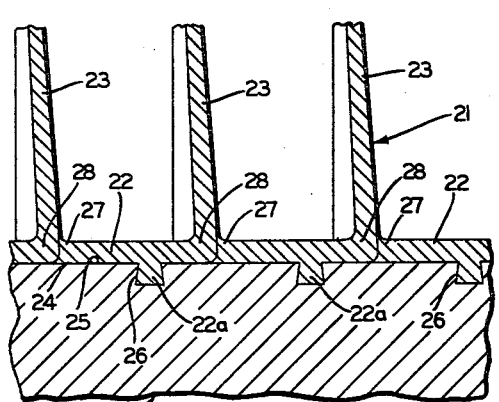
Figure 11:
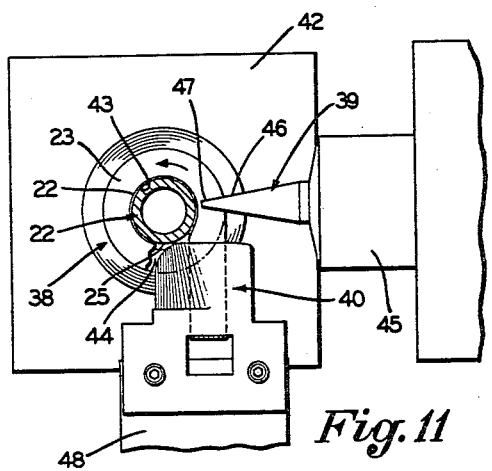
Figure 15:
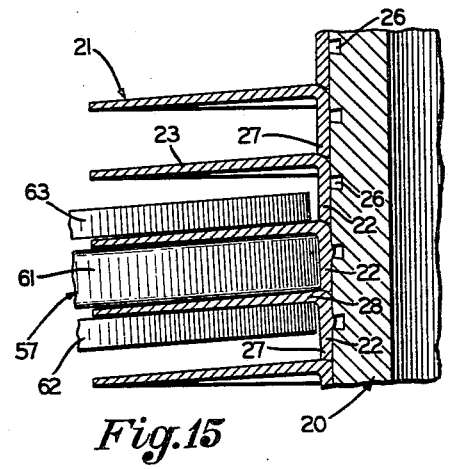
Figure 12:
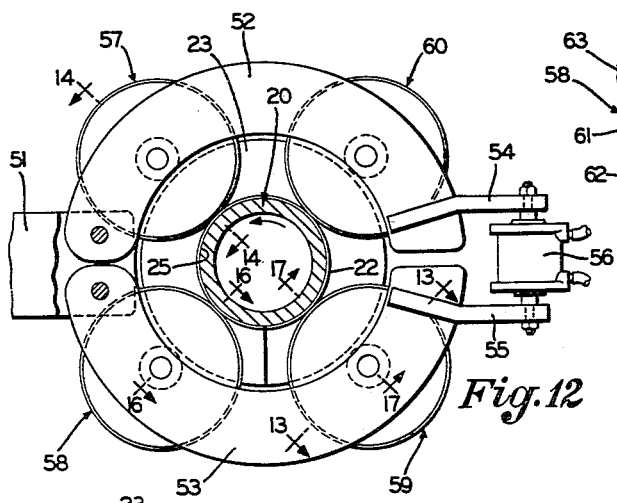
Figure 16:
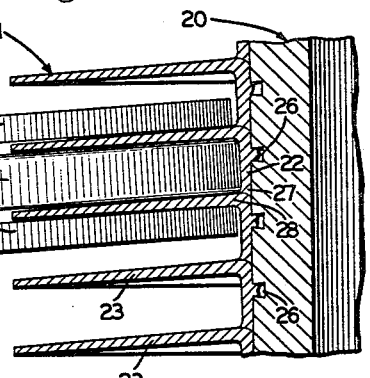
Figure 14:
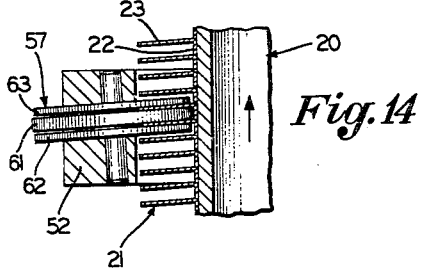
Figure 17:
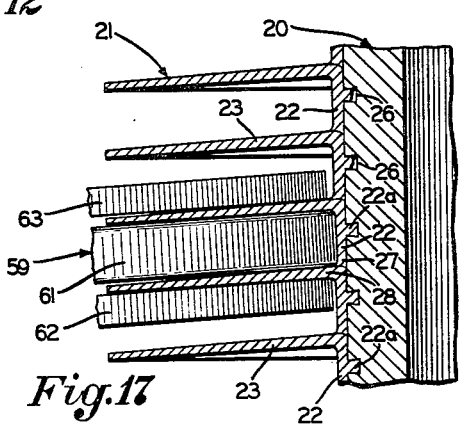
Figure 13:
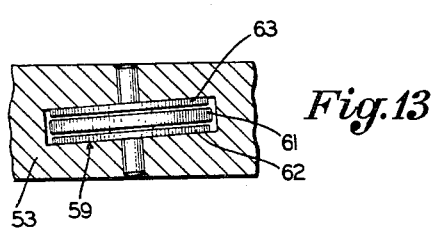

By way of example, an embodiment of the embedded footed fin construction and the steps of the preferred method of the present invention are illustrated in the accompanying drawings forming a part hereof, wherein like numerals indicate similar parts throughout the several views, and in which:

FIG. 1 is a fragmentary vertical sectional view, part in elevation, of tubing illustrating the first step of the preferred method of the present invention;

FIG. 2, a view similar to FIG. 1 illustrating the second step of the preferred method of the present invention;

FIG. 3, a fragmentary vertical sectional view, part in elevation, showing the tubing of FIG. 2 having helically wound footed fins applied thereto and illustrating the third step of the preferred method of the present invention;

FIG. 4, a view similar to FIG. 3 illustrating the fourth step of the preferred method of the present invention;

FIG. 5, a fragmentary vertical sectional view of tubing and the groove cutting tool in the process of performing the first step of the preferred method of the present invention;

FIG. 6, a fragmentary vertical sectional view, part in elevation, showing a forming roll working on tubing and performing the second operation of the preferred method of the present invention;

FIG. 7, a fragmentary top plan view illustrating apparatus performing the third operation of the preferred method of the present invention;

FIG. 8, a fragmentary side elevation of the apparatus of FIG. 7;

FIG. 9, a fragmentary sectional view, part in elevation, looking in the direction of the arrows 9—9 in FIG. 8;

FIG. 10, a fragmentary sectional view, part in elevation, looking in the direction of the arrows 10—10 in FIG. 9;

FIG. 11, a fragmentary sectional view, part in elevation, looking in the direction of the arrows 11—11 in FIG. 8;

FIG. 12, a fragmentary end view, part in section, illustrating the apparatus performing the fourth operation of the preferred method of the present invention;

FIG. 13, a fragmentary sectional view, part in elevation, looking in the direction of the arrows 13—13 in FIG. 12;

FIG. 14, a fragmentary sectional view, part in elevation, looking in the direction of the arrows 14—14 in FIG. 12;

FIG. 15, an enlarged fragmentary view taken from FIG. 14;

FIG. 16, an enlarged fragmentary sectional view, part in elevation, looking in the direction of the arrows 16—16 in FIG. 12; and FIG. 17, an enlarged fragmentary sectional view, part in elevation, looking in the direction of the arrows 17—17 in FIG. 12.

The finished finned heat exchanger tube product is best shown in fragmentary vertical section in FIG. 4 and includes an inner tube generally indicated at 20 preferably formed from steel and being provided with a covering sheath formed by the footed fins generally indicated at 21. The footed fins 21 are preferably formed from a relatively corrosion-resistant metal, softer than the steel of the inner tube 20, such as aluminum, with these footed fins including generally hollow cylindrical or tubular foot portions 22 and generally radially extending fin portions 23.

The sheath-like footed fins 21 are positioned telescoped over the inner tube 20, with the inner cylindrical surfaces 24 of the fin foot portions 22 tightly abutting the outer cylindrical surface 25 of the inner tube 20. Finally, the preferably dove-tail grooves 26 are formed in the tube outer cylindrical surface 25 preferably in proper registry underlying the fin foot portions 22, with a part of these foot portions 22a being embedded in the grooves 26 to form an actual physical metal-to-metal interlock and heat transfer bond between the inner tube 20 and footed fins 21.

As shown in FIG. 4 and as will be hereinafter more clearly shown and described with reference to the preferred method of the present invention, this preferred form of footed fin tube product has these generally L-shaped cross-section footed fins 21 helically wound on the inner tube 20, with the tube grooves 26 likewise preferably being helical to provide proper predetermined registry between these grooves and fin foot portions 22. Furthermore, in this preferred product, a tight compressive abutment, preferably formed by rolling, is provided between the free ends 27 of the fin foot portions 22 and the adjacent connected ends 28 of the next adjacent foot portions 22, which connected ends 28 are connected to the fin portions 23. In this manner a fluid-tight seal may be provided between the helical foot portion 22 to form the fluid-tight sheath-like covering for the inner tube 20.

For maximum results with the product of the present invention, it is also preferred to provide certain proportional dimension limitations on certain portions of the footed fins 21 for providing the optimum heat flow path between the fin portions 23 of the footed fins 21 and the inner tube 20. These proportional dimension limitations are also desirable from the strength standpoint.

As shown in FIG. 4, it is preferred to form the groove 26 having an axial width at the outer cylindrical surface 25 of the tube 20 at least as great or greater than the axial width of the fin portions 23 at their points of juncture with the foot portion connected ends 28, so that the axial widths of the portions 22a of the foot portions 22 at the point where these portions 22a connect to the remainder of the foot portions 22 will be as great as the axial width of fin portions 23 at their points of juncture with the foot portion connected ends 28. Furthermore, the radial thicknesses of the parts of foot portions 22 extending between these portions 22a and the fin portions 23 must likewise be as great as the axial widths of the fin portions 23 at their points of juncture with the foot portion connected ends 28.

Still further, the length of surface of the portions 22a of the foot portions 22 in contact with the surfaces of the grooves 26 should be at least as great as the axial width of the fin portions 23 at their points of juncture with the foot portion connected ends 28. In the present construction, this length of surface contact between the portions 22a of the foot portions 22 and the surfaces of the grooves 26 will be determined in most cases by the addition of the generally radial lengths of contact of the portions 22a with the side walls 32 of grooves 26.

In other words, to provide the optimum heat flow path between the fin portions 23 and the inner tube 20, the axial lengths of the portions 22a at the mouths of the dove-tail grooves 26 or the tube outer cylindrical surface 25, the combined lengths of the surfaces of portions 22a in contact with the surfaces of grooves 26, and the radial thicknesses of the parts of foot portions 22 extending between portions 22a and the fin portions 23, must each be at least as great as the axial widths of the fin portions 23 at their points of juncture with the foot portion connected ends 28. With this particularly dimensioned footed fin construction, there is no constriction in heat flow path between the fin portions 23 and the inner tube 20.

Also, from the strength standpoint, it is again preferred that the axial widths of portions 22a of the foot portions 22 at the tube outer cylindrical surface 25 or footed fin inner cylindrical surface 24 be at least as great or greater than the axial widths of fin portions 23 at the points of juncture of these fin portions with the foot portion connected ends 28. Thus, if yielding occurs in the footed fins 21 as a result of the differences in the coefficients of thermal expansion tending to cause the footed fins to pull away from the inner tube 20, this yielding will occur at a location where it will not impair the heat transfer capabilities of the construction.

The preferred method of the present invention for forming the preferred product described above includes four basic steps resulting in the three semi-finished parts of FIGS. 1, 2 and 3 and the final product of FIG. 4. As shown in FIG. 1, the first step includes the forming of preferably the helical grooves 29 in the outer cylindrical surface 25 of the inner tube 20, with grooves 29 being actually cut, that is, removing the metal to form the same, and with these grooves being generally U-shaped and having generally right-angle corners forming the radially extending side walls 30 and axially extending bottom walls 31.

Next, the grooves 29 are formed into the dove-tail grooves 26 by compressively rolling the outer cylindrical surface 25 of the inner tube 20, thereby resulting in the part shown in FIG. 2. In this case, the grooves 26 are formed of generally dove-tail cross section having the inwardly angling side walls 32 angling toward each other from the bottom walls 31 to the inner tube outer cylindrical surface 25. Furthermore, it is obvious that if the foregoing rolling operations are to be performed, the inner tube 20 must be of sufficient radial strength to resist collapse during such rolling operations, as well as subsequent rolling operations to be hereinafter explained.

Next, the footed fins 21 are preferably helically wound on the outer cylindrical surface 25 of the inner tube 20, with the fin foot portion 22 overlying the grooves 29 of the inner tube 20 and with the fin portions 23 extending generally radially from the outer cylindrical surface 25 of the inner tube 20, as shown in FIG. 3. Furthermore, at this point, the ends 27 of the fin foot portions 22 preferably abut the axially adjacent foot portion connected ends 28, as shown, and the fin foot portions 22 are merely overlying and bridge the grooves 26 of tube 20.

Finally, in the fourth operation, which preferably includes a series of rolling operations, parts of the fin foot portions 22 are rolled down into the grooves 26 forming the portions 22a, and rolling also causes the previously described tight compressive abutment between the free ends 27 of the fin foot portions 22 and the connected ends 28 of the adjacent fin foot portions, thereby resulting in the finished product of FIG. 4. In the latter phase of this fourth operation, any angular misalignment between the fin foot portions 22 and fin portions 23 is removed by this rolling so that the proper spacing is maintained between adjacent fin portions 23. Again, as pointed out in the foregoing, in order for these final radial pressure forming operations, in this case rolling, to be performed, it is necessary that the inner tube 20 be of sufficient strength and rigidity to resist collapse against such rolling or radial forming operations.

As shown in FIGS. 5 through 17, the various operations of the preferred method of the present invention are formed in sequence preferably by mounting the various tools for performing these steps on a single machine, with the various tools being mounted in stationary positions relative to each other while the tube 20 is rotated and at the same time is being fed axially through the machine by usual apparatus, not shown, thereby providing a helical motion to the tubing relative to these tools. It should be understood, however, that these various operations could be performed by other forms of tools and apparatus without departing from the scope of the present invention, for instance, by merely rotating the tube and moving the tools axially.

As shown in FIG. 5, the first operation is performed with a stationary three-stage cutting tool 33, with the tube 20 moving axially and at the same time rotating. The first cutter 34 of the cutting tool 33 extends radially approximately a third of the full depth of the final grooves 29 and cutter 34 begins the forming of these grooves.

The second cutter 35 extends radially approximately two-thirds of the depth of the final grooves 29 and is the second cutter to engage tube 20, while the third cutter 36 extends radially the full depth of the grooves 29 and is the final cutter to engage the tube 20 to finally form the finished groove 29 of the first operation. Thus, the grooves 29 are helically formed in approximately three equal depth stages by the cutters 34, 35 and 36 resulting in the first operation finished grooves 29.

In the second operation, as shown in FIG. 6, the grooves 29 are changed to the form of the grooves 26 by means of the roll 37 positioned axially straddling or bridging the grooves 29 and applying radial pressure to deform the grooves 29 into the generally dove-tail cross-section grooves 26. Again, in this second operation, the roll 37 is rotatably mounted but is in a fixed position relative to the remainder of the tools, with the tube 20 moving helically by the roll 37 and with the roll being aligned to follow the helical groove 29 and form the helical groove 26.

The third operation is performed by the apparatus shown in FIGS. 7 through 11 and includes a stationary die 38, a rotatably mounted guide roll 39, a fin strip feed guide 40 and a fin strip feed roll 41. As shown, the stationary die 38 is positioned on a suitable mounting 42 and telescopically receives the tube 20 having the grooves 26 formed in the outer cylindrical surface 25 thereof, with tube 20 moving axially through the central opening 43 in die 38 while at the same time rotating.

Outwardly of the opening 43, die 38 is provided with the generally conical guide surface 44 which extends radially from opening 43 a radial distance greater than the radial height of the fin portions 23 of the footed fins 21. Finally, the opening 43 in die 38 is only slightly larger in diameter than the outer cylindrical surface 25 of tube 20, so that the conical guide surface 44 terminates radially inwardly adjacent the axially and spirally moving tube surface 25.

The guide roll 39 is rotatably mounted on a suitable mounting 45 and is likewise provided with an outer conical guide surface 46 which, when the guide roll 39 is positioned adjacent the guide surface 44 of die 38, as shown, is generally a matching guide surface maintained generally uniformly spaced from the die guide surface 44. Further, when the guide roll 39 is positioned, as shown, the inner end 47 thereof is spaced slightly outwardly from the die opening 43 and thereby radially outwardly from the tube outer surface 25.

The material forming the footed fins 21 is initially preferably in the form of strip fin material and is drawn from a source of supply, not shown, over the fin strip feed roll 41 to the fin strip feed guide 40. Guide 40 is positioned on a suitable mounting 48 and preferably extends vertically upwardly underlying the tube 20 and guide roll 39, as shown in FIGS. 8 and 11.

Further, guide 40 is preferably provided with an axially extending opening 49 at the lower portion thereof and a generally vertically extending opening 50 extending from opening 49 vertically upwardly and opening beneath tube 20 and guide roll 39 axially adjacent the guide surface 44 of the stationary die 38. Thus, the fin strip material is fed into the fin strip feed guide 40 through the opening 49 and then vertically upwardly through the opening 50. Also, this feed guide 40 is positioned so that the fin strip approaches the outer surface 25 of tube 20 at a position radially inwardly from tangent to surface 25, and between the conical guide surface 44 of die 38 and the conical guide surface 46 of the guide roll 39.

As shown in FIG. 11, due to this off-tangent approach of the fin strip material to the tube 20, a portion thereof is folded over axially to form the fin foot portions 22, with the remainder thereof passing between the die and guide roll conical guide surfaces 44 and 46 to form the fin portions 23. Further, in view of the inner end 47 of guide roll 39 being spaced radially from the tube outer surface 25, this folding of the fin strip material to form the footed fins 21 causes the fin foot portions 22 to pass beneath or radially inwardly from the guide roll inner end 47, while this guide roll inner end aids in forming the footed fins to their generally L-shaped cross section, thereby resulting in the previously described third operation part, shown in FIG. 3.

One important feature of the preferred method comprising the present invention and made possible due to the preferred product shown in the drawings and hereinafter described, is a savings in fin strip material so that the amount of fin strip material necessary for forming this preferred product of the present invention is approximately the same as the amount of fin strip material that would be required for forming conventional finned tubing having merely radially extending fins mounted thereon without the sheath or cladding for the tubing.

In such conventional finned tubing in which the inner radial edge of the fin is seated in a groove formed in the tubing outer circumferential surface, it is necessary to maintain sufficient thickness of the fin at the extreme outer radial end so that pressure can be applied to this extreme outer radial end to seat the fin material in the groove of the tubing. For this reason, fin strip material for conventional, merely radially extending fins is applied to the outer circumferential surface of the tubing with this strip material being bent around a radius at the fin outer extremity, in order to maintain a fin thickness sufficient throughout the entire radial extent of the fin to withstand the necessary radial pressures for seating the fin strip material in the grooves of the tubing. The length of fin strip material required for this conventional form of construction is, therefore, determined by the length at the extreme outer radius of the fins, with this material during application being compressed throughout its entire radial length, from this extreme outer radius inwardly to its minimum radius.

In the preferred method and product of the present invention, however, since it is unnecessary to apply radial pressure to the fin portions 23, but rather all such radial pressure is applied against the foot portions 22 for forming these foot portions into the grooves 26 of tube 20, the fin strip material is applied by bending it around a radius approximately one-third the radial distance along the fin portions 23 from the foot portions 22. Thus, in this case the outer two-thirds of the fin portions 23 are stretched during application of the fin strip material, whereas the inner one-third portions of the fin portions 23 and also the foot portions 22 are compressed. For this reason, less fin strip material is required for the fin portions 23 and this savings in fin strip material is used for forming the foot portions 22, so that the amount of fin strip material required for the preferred method and product of the present invention may be approximately the same as the amount of fin strip material required for conventional, merely radially extending fins.

The apparatus for performing the fourth operation is illustrated in FIGS. 12 through 17 and includes a stationary frame member 51, upon which are pivotally mounted the upper and lower arcuate arms 52 and 53. Frame member 51 is preferably mounted spaced from one side of the tube 20, with the arms 52 and 53 passing over and under tube 20 to substantially surround this tube.

The opposite ends of the arms 52 and 53 from the frame member 51 are provided with the pressure members 54 and 55, respectively, with members 54 and 55 being attached to a fluid-pressure cylinder 56. Finally, four roll assemblies 57, 58, 59 and 60 are rotatably mounted equally spaced around the tube outer surface 25, with roll assemblies 57 and 60 being mounted on the upper arm 52 and the roll assemblies 58 and 59 being mounted on the lower arm 53.

Further, as shown in FIG. 14, which is a section through the roll assembly 57, these roll assemblies are positioned so that the main forming roll 61 pressure engages the fin foot portions 22 virtually the entire axial length of these foot portions between the fin portion 23 integrally connected to this particular foot portion and the next adjacent fin portion 23. The auxiliary straightening rolls 62 and 63 are spaced axially at either side of the main forming rolls a distance substantially equal to the axial thickness of the fin portions 23, but these rolls 62 and 63 do not extend entirely radially inwardly to the fin foot portions 22 and rather are spaced slightly radially therefrom.

Thus, the roll assemblies 57 through 60, through the main forming rolls 61, perform the rolling operations on the fin foot portions 22 while the auxiliary straightening rolls 62 and 63 maintain the various fin portions 23 in proper axially spaced relationship. Also, the various roll assemblies 57 through 60 are positioned in their respective arms 52 and 53 so that the roll assembly 57 first engages the tube and footed fin assembly from the third operation, as shown in FIG. 3, and the remaining roll assemblies 58, 59 and 60 engage this tube and footed fin assembly in sequence thereafter.

Thus, in this fourth operation, the roll assembly 57 first engages the tube and footed fin assembly, as shown in FIG. 15, with the main forming roll 61 thereof beginning to roll the fin foot portions 22 into the tube grooves 26 and also beginning to roll the free ends 27 of the fin foot portions 22 against the connected ends 28 of the adjacent fin foot portions. Next, as shown in FIG. 16, the roll assembly 58 engages this tube and footed fin assembly, with the main forming roll 61 further forming the fin foot portions 22 into the tube grooves 26 and at the same time further forming the free ends 27 of the fin foot portions 22 against the connected ends 28 of the adjacent fin foot portions.

Still further, as shown in FIG. 17, the roll assembly 59 next engages this tube and footed fin assembly, finally forming the fin foot portions 22 into the tube grooves 26 and also finally compressively abutting the free ends 27 of the fin foot portions 22 with the connected ends 28 of the adjacent fin foot portions. The roll assembly 60 merely serves for further forming, if necessary, to insure completion thereof and also as a final straightening operation for the fin portions 23 of the footed fins 21.

Although in this fourth operation the actual forming of the fin foot portions 22 has been shown as being performed by the first three roll assemblies 57, 58 and 59, it should be understood that whether this forming takes place fully with the first roll assembly or with the addition of succeeding roll assemblies is entirely dependent on the particular material, both as to hardness and composition from which the footed fins 21 are formed, and these various roll assemblies may be constructed as required, fully within the scope of the present invention. Furthermore, it is preferable to provide the four roll assemblies equally spaced around the outer cylindrical surface 25 of the tube 20 in order to exert substantially equal pressures from all directions on tube 20, to thereby prevent the collapse thereof under the necessary rolling pressures required for performing this fourth operation.

An important feature of this fourth operation is that the fin foot portions 22 are formed into the tube grooves 26 solely by the radial pressure exerted from the main forming rolls 61 of one or more of the roll assemblies 57 through 60, to thereby provide a metal-to-metal interlock and heat transfer bond between the tube 20 and the footed fins 21. A further important feature of this fourth operation is the compressive abutment also produced by the main forming rolls 61 between the free ends 27 of the fin foot portions 22 and the connected ends 28 of the adjacent fin foot portions 22.

Thus, according to the principles of the present invention a footed finned tubing construction is provided, whether by helically winding footed fins on tubing or otherwise applying a sheath over the tubing having fins formed thereon to form footed fins, in which the footed fins are embedded in the tubing outer surface to provide a metal-to-metal interlock and heat transfer bond between the tubing and the covering footed fins which will maintain the tubing and its covering sheath and fins in proper heat transfer contact, despite the assembly being subjected to high-temperature levels or gradients. Furthermore, in the case where the continuous strip-like footed fins are helically wound on the tubing and embedded in grooves formed in the tubing outer surface, a tight compressive abutment forming a seal or bond may be provided between the free ends of foot portions of the L-shaped fins and the connected ends of adjacent foot portions of adjacent L-shaped fins, which seal or bond is fluid-tight so that the footed fins may provide a complete corrosion-resistant sheath for the tubing.

As hereinbefore pointed out, it is preferred to provide the metal-to-metal interlock and heat transfer bond between the tube 20 and the sheathing or finned foot portions 22 by means of the dove-tail cross-section grooves 26 in tubing 20 receiving the dove-tail cross-section embedded portions 22a of the fin foot portions 22, for instance, as clearly shown in FIG. 4. The purpose of this form of metal-to-metal interlock, again as clearly shown in FIG. 4, is to provide within the grooves 26 of the tubes a portion of the tube metal radially outwardly overlying portions of the metal of the fin foot portions 22, that is, outwardly overlying portions of the metal of the embedded portions 22a, in order to prevent the fin foot portions 22 from pulling radially away from the tube 20 and destroying heat transfer contact therebetween when the assembly is subjected to high temperature gradients or variations. Thus, the prime requirement of the metal-to-metal interlock is that portions of the tube metal will outwardly overlie portions of the underlying fin metal within the grooves 26 to prevent the fins from pulling radially away from the tube during repeated expansion and contraction of the various parts, and this is best accomplished by the dove-tail cross-section grooves 26 receiving dove-tail cross section embedded portions 22a of the fin foot portions 22, thereby providing tube metal outwardly overlying fin metal at both sides of the grooves 26.

Finally, it should be understood that although the preferred form of product of the present invention is shown as having footed fins 21 formed with foot portions 22 completely covering the outer circumferential surface 25 of tube 20, advantages from the present invention can be gained by the use of footed fins 21 having foot portions 22 which only partially cover the outer circumferential surface 25 of tube 20, where corrosion resistance is not a problem. Footed fins having foot portions of reduced axial length but still having the metal-to-metal interlock and heat transfer bond with the tube are therefore fully contemplated within the scope of the present invention as well as any slight modifications in the methods of the present invention necessary for producing such a product. Also, continuous generally strip-like fins whether helically wound or otherwise positioned on the inner tubing are likewise contemplated within the scope of the products and methods of the present invention.

In the foregoing description, certain terms have been used for brevity, clearness and understanding, but no unnecessary limitations are to be implied therefrom, because such words are used for descriptive purposes herein, and are intended to be broadly construed.

Moreover, the embodiments of the improved constructions and methods illustrated and described herein are by way of example, and the scope of the present invention is not limited to the exact details of the construction shown.

Having now described the invention, the constructions, methods, operation and use of preferred embodiments thereof, and the advantageous new and useful results obtained thereby; the new and useful constructions and method and reasonable mechanical equivalents thereof obvious to those skilled in the art are set forth in the appended claims.

We claim:

1. The method of making a finned metal heat exchanger tube which includes the steps of initially forming groove means in the outer surface of a metal tube with said groove means extending inwardly of the tube metal from said tube outer surface and opening outwardly at said tube outer surface and with certain portions of the tube metal outwardly overlying parts of said groove means, said tube having sufficient radial strength for withstanding subsequent radial pressure forming operations; then at least partially telescopically encasing the tube with a metal sheath with said sheath abutting the tube outer surface and having helically extending fins formed thereon and extending radially therefrom; locating sheath fin means free from overlying the tube groove means with said sheath spanning the groove means between the fin means along the tube outer surface; and then radial pressure forming, displacing and embedding the sheath metal between the fin means in the zone of the groove means inwardly into the groove means with parts of the sheath metal at least partially inwardly underlying said tube metal certain portions so that the sheath metal parts are interengaged with said tube metal certain portions within the groove means, thereby providing an interlocking metal-to-metal heat transfer bond between the tube and sheath metals resisting separation despite subjection to severe temperature gradients.

2. The method of making a finned metal heat exchanger tube which includes the steps of initially forming helically extending groove means in the outer surface of a metal tube with said groove means extending inwardly of the tube metal from said tube outer surface and opening outwardly at said tube outer surface and with certain portions of the tube metal outwardly overlying parts of said groove means, said tube having sufficient radial strength for withstanding subsequent radial pressure forming operations; then at least partially telescopically encasing the tube with a metal sheath with said sheath abutting the tube outer surface and having helically extending fins formed thereon and extending radially therefrom; locating the sheath fin means free from overlying the tube groove means with said sheath spanning the groove means between the fin means along the tube outer surface; and then rolling the sheath metal in a helical path between the fin means displacing and embedding the sheath metal in the zone of the groove means inwardly into the groove means with parts of the sheath metal at least partially inwardly underlying said tube metal certain portions so that the sheath metal parts are interengaged with said tube metal certain portions within the groove means, thereby providing an interlocking metal-to-metal heat transfer bond between the tube and sheath metals resisting separation despite subjection to severe temperature gradients.

3. The method of making a finned metal heat exchanger tube which includes the steps of initially forming groove means in the outer surface of a metal tube with said groove means extending inwardly of the tube metal from said tube outer surface and opening outwardly at said tube outer surface and with certain portions of the tube metal outwardly overlying parts of said groove means, said tube having sufficient radial strength for withstanding subsequent radial pressure forming operations; then positioning generally L-shaped cross-section metal fin means on the outer surface of the metal tube; at least partially telescopically encasing and abutting the tube outer surface with axially extending portions of the fin means during said positioning; locating radially extending portions of the fin means free from overlying the tube groove means during said positioning with said fin means axially extending portions overlying and spanning the tube groove means; and then rolling the fin means axially extending portions between the fin means radially extending portions displacing and embedding the fin means metal in the zone of the groove means inwardly into the groove means with parts of the fin means metal at least partially inwardly underlying said tube metal certain portions so that the fin means metal parts are interengaged with said tube metal certain portions within the groove means, thereby providing an interlocking metal-to-metal heat transfer bond between the tube and fin means metals resisting separation despite subjection to severe temperature gradients.

4. The method of making a finned metal heat exchanger tube which includes the steps of initially helically forming substantially continuous groove means in the outer surface of a metal tube with said groove means extending inwardly of the tube metal from said tube outer surface and opening outwardly at said tube outer surface and with certain portions of the tube metal outwardly overlying parts of said groove means, said tube having sufficient radial strength for withstanding subsequent radial pressure forming operations; then helically winding substantially continuous generally L-shaped cross-section metal fin means onto the outer surface of the metal tube; at least partially telescopically encasing and abutting the tube outer surface with axially extending portions of the fin means during said winding; locating said fin means axially extending portions overlying and spanning the tube groove means during said winding; and then radial pressure forming, displacing and embedding the fin means axially extending portions in the zone of the groove means inwardly into the groove means with parts of the fin means metal at least partially inwardly underlying said tube metal certain portions so that the fin means metal parts are interengaged with said tube metal certain portions within the groove means, thereby providing an interlocking metal-to-metal heat transfer bond between the tube and fin means metals resisting separation despite subjection to severe temperature gradients.

5. The method of making a finned metal heat exchanger tube which includes the steps of initially helically forming substantially continuous groove means in the outer surface of a metal tube with said groove means extending inwardly of the tube metal from said tube outer surface and opening outwardly at said tube outer surface and with certain portions of the tube metal outwardly overlying parts of said groove means, said tube having sufficient radial strength for withstanding subsequent radial pressure forming operations; then helically winding substantially continuous generally L-shaped cross-section metal fin means onto the outer surface of the metal tube; at least partially telescopically encasing and abutting the tube outer surface with axially extending portions of the fin means during said winding; locating radially extending portions of the fin means free from overlying the tube groove means with said fin means axially extending portions overlying and spanning the tube groove means during said winding; and then rolling the fin means axially extending portions between the fin means radially extending portions displacing and embedding the fin means metal in the zone of the groove means inwardly into the groove means with parts of the fin means metal at least partially inwardly underlying said tube metal certain portions so that the fin means metal parts are interengaged with said tube metal certain portions within the groove means, thereby providing an interlocking metal-to-metal heat transfer bond between the tube and fin means metals resisting separation despite subjection to severe temperature gradients.

6. The method of making a finned metal heat exchanger tube which includes the steps of initially helically forming substantially continuous groove means in the outer surface of a metal tube with said groove means extending inwardly of the tube metal from said tube outer surface and opening outwardly at said tube outer surface and with certain portions of the tube metal outwardly overlying parts of said groove means, said tube having sufficient radial strength for withstanding subsequent radial pressure forming operations; then helically winding substantially continuous generally L-shaped cross-section metal fin means onto the outer surface of the metal tube; telescopically encasing and abutting the tube outer surface with axially extending portions of the fin means during said winding; locating radially extending portions of the fin means free from overlying the tube groove means with said fin means axially extending portions overlying and spanning the tube groove means during said winding; locating free ends of said fin means axially extending portions adjacent other fin means during said winding; then rolling parts of the fin means axially extending portions between the fin means radially extending portions displacing and embedding the fin means metal in the zone of the groove means inwardly into the groove means with parts of the fin means metal at least partially inwardly underlying said tube metal certain portions so that the fin means metal parts are interengaged with said tube metal certain portions within the groove means, thereby providing an interlocking metal-to-metal heat transfer bond between the tube and fin means metals resisting separation despite subjection to severe temperature gradients; and by rolling of the fin means axially extending portions tightly compressively abutting said free ends of the fin means axially extending portions to said adjacent other fin means to form a substantially fluid-tight joint between said free ends and said other fin means.

7. The method of making a finned metal heat exchanger tube which includes the steps of initially helically cutting substantially continuous generally U-shaped cross-section groove means in the outer surface of a metal tube with said groove means extending inwardly of the tube metal from said tube outer surface and opening outwardly at said tube outer surface, said tube having sufficient radial strength for withstanding subsequent radial pressure forming operations; then rolling the tube outer surface adjacent the groove means forming the groove means into generally dove-tail cross-section of lesser cross-sectional width at the tube outer surface, thereby locating certain portions of the tube metal outwardly overlying parts of said groove means, then helically winding substantially continuous generally L-shaped cross-section metal fin means onto the outer surface of the metal tube; at least partially telescopically encasing and abutting the tube outer surface with axially extending portions of the fin means during said winding; locating said fin means axially extending portions overlying and spanning the tube groove means during said winding; and then radial pressure forming, displacing and embedding the fin means axially extending portions in the zone of the groove means inwardly into the groove means with parts of the fin means metal at least partially inwardly underlying said tube metal certain portions so that the fin means metal parts are interengaged with said tube metal certain portions within the groove means, thereby providing an interlocking metal-to-metal heat transfer bond between the tube and fin means metals resisting separation despite subjection to severe temperature gradients.

References Cited in the file of this patent
UNITED STATES PATENTS

| | | |
|---|---|---|
| 1,455,028 | McCord | May 15, 1923 |
| 1,729,747 | Palm | Oct. 1, 1929 |
| 1,829,979 | Bundy | Nov. 3, 1931 |
| 2,025,036 | Berg | Dec. 24, 1935 |
| 2,050,993 | Bush | Aug. 11, 1936 |
| 2,326,176 | Schierenbeck | Aug. 10, 1943 |
| 2,754,577 | Maxwell | July 17, 1956 |

FOREIGN PATENTS

| | | |
|---|---|---|
| 401,474 | Germany | Sept. 4, 1924 |
| 664,786 | France | Apr. 29, 1929 |